April 9, 1963
G. PICCA
3,084,417
METHOD OF MAKING A BALL JOINT
Filed Sept. 6, 1960
2 Sheets-Sheet 1
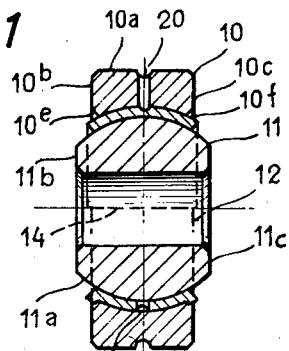
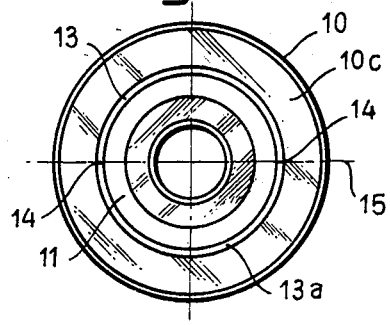
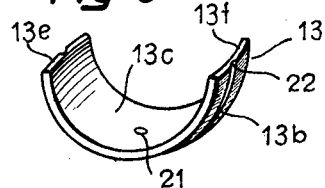
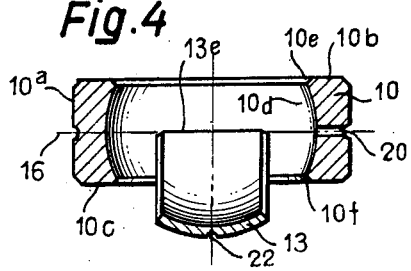
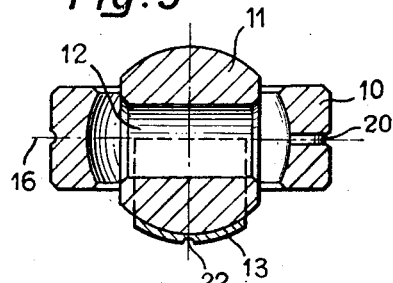
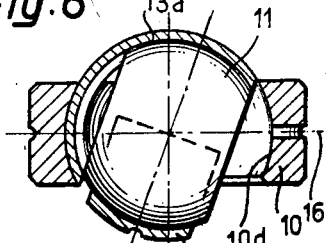
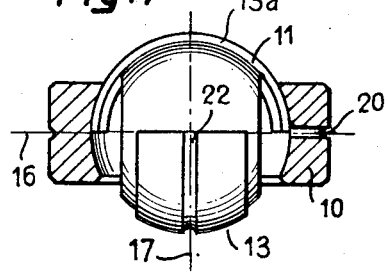
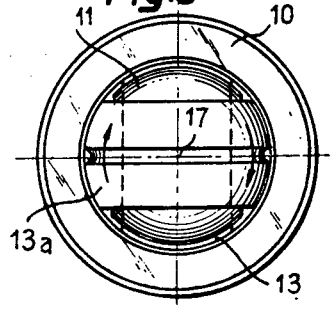

April 9, 1963 G. PICCA 3,084,417
METHOD OF MAKING A BALL JOINT
Filed Sept. 6, 1960 2 Sheets-Sheet 2
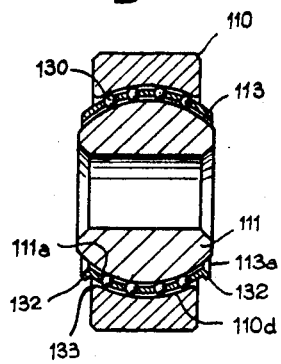
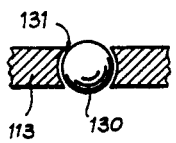
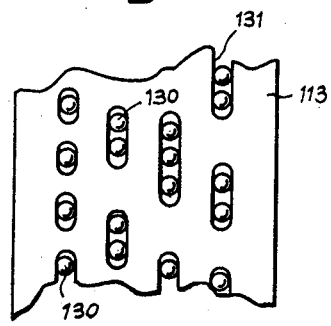
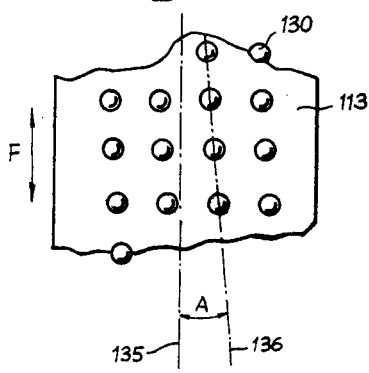

United States Patent Office 3,084,417
Patented Apr. 9, 1963

3,084,417
METHOD OF MAKING A BALL JOINT
Giacomo Picca, Villar Perosa, Italy, assignor to RIV Officine di Villar Perosa Società per Azioni, Turin, Italy
Filed Sept. 6, 1960, Ser. No. 54,246
Claims priority, application Italy Nov. 14, 1959
2 Claims. (Cl. 29—149.5)

This invention relates to a method of making ball joints or spherical bearings of the kind comprising an external ring, a sphere concentric with the ring, and a separator in antifriction material interposed between the sphere and the ring, all these components being formed in rigid materials, metals in general.

In the majority of cases of application of such joints, the sphere and the ring are in steel, whilst the separator could be in bronze, brass or in any suitable antifriction alloy.

A ball joint of this kind is described for instance in U.S. Patent No. 2,366,668, granted to L. R. Heim, where the ring and the sphere are each in one piece, while the separator consists in two annular bushings forced in between the sphere and the ring. One inconvenience of such known construction is that one or the other bushing can easily be torn out of the ring by an impact or tear on the sphere. Also, the separator is finally formed in situ, i.e. in the space between the sphere and the ring, the reciprocal centering of parts, in question is never exact; for the same reason, it is not possible to provide sphere lubrication grooves in the ring and separator. It is also obvious, that such a joint require a certain running-in, as when completed, the sphere is tightly locked by the separator. Lastly, separators being turned on a lathe, necessitate a large excess of antifriction material, thus making the joint less economical.

There are also ball joints where at least one of the three elements: sphere, separator or ring are made in a plurality of parts such as sectors or segments; such structures, however, are hindered by plays between parts, require accurate machining, and do not satisfactorily withstand impact or tear; moreover, due to the high number of components, assembly is rather complicated.

It is an object of this invention to provide a method of making a ball joint which ball joint per se comprises, in combination, a one-piece ring with the inner surface constituted by a concave seat coinciding with an equatorial zone of a sphere, a one-piece sphere, formed with a through bore arranged coaxially within the said seat; a separator interposed between the sphere and said seat, said separator comprising two identical hemispherical segments with abutment surfaces in contact, and having a convex outer surface matching said seat, and a concave inner surface matching the sphere; means situated on said ring and said separator for fixing the separator coaxially within the ring.

The ball joint, as defined above, is made by using a procedure characterised in that it comprises the following operations: providing a metallic one-piece ring, with its inner surface constituted by a concave seat coinciding with an equatorial zone of a sphere; providing a one-piece sphere with a through bore having its spherical radius smaller than said seat; providing two identical hemispherical segments, suitable to form jointly an annular separator having a convex outer surface matching said seat, and a concave inner surface matching said sphere; introducing the first of the two segments and sphere into the ring in a manner whereby the geometrical axes of the segment and sphere coincide and are situated in the equatorial plane of the said seat; introducing the second segment into the free gap between the ring and sphere in a manner whereby the axis of said second segment is perpendicular to both axes situated in said equatorial plane; rotating mutually about the ring axis said second segment and the group comprising the sphere and first segment through an angle sufficient to bring the abutment surfaces of the segments into contact within said seat; and rotating the group comprising the sphere and separator concentrically within the ring, until their respective geometrical axes coincide.

The advantages of a ball joint made according to the present invention mainly result from the structure and form of the separator means. Having both segments identical makes manufacture simple and economic, by permitting the stamping of segments out of antifriction material sheets like bronze or brass of a convenient minimum thickness. While stamping the segments it is possible to provide the lubricating grooves and holes. Moreover such a joint, by having the separator supported internally and externally, satisfactorily withstands axial impact or tear. Also, deformations and formations of excessive play between parts is thus eliminated.

Two embodiments of this invention will be further described with reference to the accompanying drawing, in which:

FIG. 1 is a cross sectional view of one embodiment of the ball joint;

FIG. 2 is an elevational view;

FIG. 3 is a perspective view of one of the segments of the separator;

FIGS. 4, 5, 6, 7 and 8 show some steps of assembly;

FIG. 9 is a cross sectional view of a further embodiment of a ball joint;

FIG. 10 is an enlarged part sectional view of a separator;

FIGS. 11 and 12 are developed part views of two variants of separator for a structure shown on FIG. 9.

The joint illustrated in FIGS. 1–8 comprises a steel ring 10 hving an outer cylindrical surface 10a, two opposed flat faces 10b, 10c, and a concave inner surface 10d, coinciding with the equatorial part of a coaxial sphere. The edges formed by intersection of the inner surface 10d with faces 10b, 10c are chamfered as indicated by 10e, 10f, respectively, in FIG. 4.

A second component of the ball joint is constituted by a steel sphere 11, provided with an axial through bore 12. The sphere is smaller in diameter than the inner surface 10d, and is flattened at the bore 12 as indicated by 11b and 11c. When assembled the sphere 11 is concentric with the ring 10.

A third component of the ball joint is a bushing of brass or bronze, formed by two identical segments 13 and 13a. Each of these segments extends over an arc of 180° and when assembled, the segments abut as indicated at 14 on FIGS. 1 and 2, forming a complete ring with the dividing plane coinciding with the common diametrical plane 15. Geometrically, the separator 13, 13a is constituted by an equatorial zone of a hollow sphere, having its outer diameter coinciding with the diameter of the ring surface 10d, and its inner diameter coinciding with the diameter of the sphere 11. In an assembled condition, the components 10, 11, 13 and 13a are all concentric and the axes of ring 10 and separator 13, 13a coincide; the ring surface 10d constitutes a seat for the separator, and the surface 11a of the sphere 11 and inner surfaces 13c of segments 13, 13a constitute a plain bearing.

In practice both segments 13, 13a are made by stamping from bronze or brass plate of convenient thickness, manufacture of the ring and sphere being according to conventional practice.

Assembly of components may be accomplished as follows: either segment, for instance 13 is introduced into the ring 10 and held oriented transversely as shown in FIG. 4, where the segment geometrical axis and abutments 13e, 13f FIG. 3, all lie in the equatorial plane 16 of the seat 10d. The sphere 11 is introduced into segment 13, so oriented as to have the bore axis 12 coinciding with the segment axis (FIG. 5). The second segment 13a is now inserted crosswise to segment 13 between the remaining exposed surfaces of the sphere 11 and seat 10d; in order to facilitate this operation, the group constituted by sphere 11 and segment 13 can be tilted as shown on FIG. 6, though this is not required of a skilled fitter. Next, the components are mutually oriented as illustrated in FIG. 7, wherein the geometrical axis of segment 13a in equatorial plane 16 is perpendicular to the common axis of sphere 11 and segment 13 also in plane 16. Thereupon the components are brought to a coaxial position by relatively rotating both segments reciprocally through approximately 90° around axis 17 of the ring 10 (see also FIG. 8), until both segments form jointly a complete separator; finally, the separator and sphere are further rotated to their final position, as shown in FIGS. 1 and 2. Once these conditions are reached, the whole ball joint is placed in a press, where the separator edges are upset against chamfered edges 10e, 10f of the ring seat as illustrated in the lower half of the FIG. 1. This upsetting serves only to prevent any accidental angular dislodging of the separator in the ring, and could be replaced by any other convenient means for holding the separator centered in the ring. Such a light upsetting of the edges does not deform the remaining part of the separator. Therefore, means can easily be provided for lubrication of surfaces in rolling contact i.e. the surface 11a of the sphere and surfaces 13c of both segments.

In the described embodiment such means comprise at least one radial passage 20 situated in the equatorial plane 16 of the ring 10, and at least one similar passage 21 in each segment of the separator, the latter being further formed with a circumferential groove 22, likewise situated in the equatorial plane 16. Consequently, in operation a lubricant can be supplied the surface 11a of the sphere 11 through passage 20, groove 22 and passage 21.

In the ball joint shown in FIG. 9, a ball bearing separator instead of a plain bushing separator is provided between the sphere 111 and ring 110. This arrangement is substantially the same as in the joint shown in FIGS. 1–8, with the following exceptions:

The radial gap between the surfaces 111a of sphere 111, and 110d of ring 110, is larger than the thickness of the separator made up of two identical halves 113, 113a, and the separator is movable in the ring 110, instead of being fixed as shown in FIGS. 1–8.

The joint shown in FIG. 9 constitutes an oscillating ball bearing, comprising rows of balls 130 nesting in a plurality of openings 131 (FIG. 10) in a cage made up of two segments of the separator 113, 113a. The diameter of the spheres 130 is larger than the thickness of the separator and fits the radial gap between the surfaces 111a and 110d. Balls 130 are snapped into the spherical recesses in openings 131, thereby being prevented from falling out of the cage in assembly or accidentally in operation. Assembly of the joint is the same as previously described with reference to FIGS. 1–8.

As shown in the top half of FIG. 9 the separator is wider in axial direction than the ring 110 and approximately equals the diameter of the sphere 111. With this arrangement annular flanges 132 can be provided as shown in the lower half of FIG. 9. Since these flanges are removed from the rounded edges 133 of the ring 110, the separator is capable of rocking within the ring 110, said rocking movement being limited by flanges 132 coming into contact with edges 133.

The openings 131 can be slotted as shown in FIG. 11, with more than one ball 130 nesting within. With this arrangement the number of balls can be increased, so that specific operating pressures can be decreased; moreover, differences in ball speeds depending on their varying distance from the axes of the bearing are made up for.

In the separator construction shown in FIG. 12, balls 130 are disposed in helical rows 136 at an angle A to the equator of the separator. This arrangement is advantageous in that with the separator rotating relatively to the sphere 111 and ring 110 in the direction of the arrow F, the balls roll along different paths, thereby reducing wear of the surfaces 110d and 111a. By selecting a suitable angle A, each ball can be caused to roll along its individual path, thereby extending the life of the ball joint.

The invention is not restricted to the construction shown in the drawing, but covers cases where, for example, the ring is associated with a support, lever or tiebar, the sphere being associated with another component, such as a crank, shaft or link. It should be understood that the ball joint can be made of different materials according to circumstances, provided the components manufactured from these materials are considered rigid, i.e. non-deformable during assembly of the joint. Such modifications and others within the skill of an ordinary mechanic in the art are within the scope and spirit of this invention as defined in the appended claims.

What I claim is:

1. Method of making a ball joint comprising the operations of: providing a metallic one-piece ring having its inner surface constituted by a concave seat coinciding with an equatorial zone of a sphere; providing a one-piece sphere with a through bore and making its radius smaller than said seat; providing two identical hemispherical segments adapted to form jointly an annular separator having a convex outer surface matching said seat, and a concave inner surface matching the sphere surface; introducing a first one of said two segments and the sphere into the ring in a manner whereby the geometrical axes of the segment and sphere coincide and are situated in an equatorial plane of the said seat; introducing the second segment into the free gap between the ring and sphere in a manner whereby the axis of said second segment is perpendicular to both axes situated in said equatorial plane; relatively rotating about the ring axis said second segment and the group comprising the sphere and first segment through an angle sufficient to bring the abutment surfaces of the segments into contact within said seat; rotating the group comprising the sphere and separator concentrically within the ring until their respective geometrical axes coincide.

2. Method according to claim 1, comprising chamfering the inner edges of ring seat, and upsetting the separator edges against the said chamfered inner edges of ring seat.

References Cited in the file of this patent

UNITED STATES PATENTS

| 2,781,238 | Carter | Feb. 12, 1957 |
| 2,804,679 | Tracy | Sept. 3, 1957 |
| 2,894,789 | Tracy | July 14, 1959 |
| 2,952,901 | King | Sept. 20, 1960 |